United States Patent
Lauer et al.

(10) Patent No.: US 9,302,207 B2
(45) Date of Patent: Apr. 5, 2016

(54) PROCESS AND APPARATUS FOR SEPARATING OUT AND REMOVING WATER PRESENT IN LIQUID FUELS, ESPECIALLY WATER FROM DIESEL OIL

(75) Inventors: Viktor Lauer, Nalbach (DE); Martin Hager, Nalbach (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 2112 days.

(21) Appl. No.: 12/225,917

(22) PCT Filed: Mar. 31, 2007

(86) PCT No.: PCT/EP2007/002912
§ 371 (c)(1),
(2), (4) Date: Oct. 2, 2008

(87) PCT Pub. No.: WO2007/134667
PCT Pub. Date: Nov. 29, 2007

(65) Prior Publication Data
US 2009/0145823 A1 Jun. 11, 2009

(30) Foreign Application Priority Data
May 23, 2006 (DE) .......................... 10 2006 024 013

(51) Int. Cl.
*B01D 17/02* (2006.01)
*B01D 36/00* (2006.01)
(Continued)

(52) U.S. Cl.
CPC .............. *B01D 36/003* (2013.01); *B01D 17/10* (2013.01); *F02M 37/0047* (2013.01); *F02M 37/0088* (2013.01); *F02M 37/221* (2013.01)

(58) Field of Classification Search
CPC ........ B01D 17/02; B01D 17/12; B01D 37/04; B01D 37/046; B01D 37/045; B01D 61/00; B01D 61/14
USPC ................. 210/637, 641, 741, 722; 123/25 A
See application file for complete search history.

(56) References Cited

U.S. PATENT DOCUMENTS 4,539,109 A 9/1985 Davis
5,078,901 A * 1/1992 Sparrow ........................ 210/744
(Continued)

FOREIGN PATENT DOCUMENTS

DE    33 08 378 A1    10/1983
DE    198 47 999 A1    4/2000
(Continued)

OTHER PUBLICATIONS

Machine translation of WO 2005/088114A1.*
(Continued)

*Primary Examiner* — Allison Fitzsimmons
(74) *Attorney, Agent, or Firm* — Wenderoth, Lind & Ponack, L.L.P.

(57) ABSTRACT

A process separates out and removes water present in liquid fuels. The fuel supplies an internal combustion engine by a fuel delivery pump (12). Water is separated out at a filter (5) having a collecting space (27) for collecting separated water and connected upstream of the suction side (11) of the fuel delivery pump (12). The pump suction action counteracts outflow of water from the collecting space (27). Depending on the amount of water collected, the pump suction action is negated, and an outlet valve at an outflow orifice (37) of the collecting space (27) is opened by a discharge (43, 53) producing a pressure gradient enabling the discharge of water from the collecting space (27) over a discharge period when the fuel delivery pump (12) is operating.

10 Claims, 3 Drawing Sheets

(51) Int. Cl.
  *B01D 17/00*  (2006.01)
  *F02M 37/00*  (2006.01)
  *F02M 37/22*  (2006.01)
  *B01D 61/00*  (2006.01)

(56) References Cited

U.S. PATENT DOCUMENTS

2006/0070956 A1\* 4/2006 Herrmann et al. ............ 210/744
2007/0186877 A1\* 8/2007 Schulz ........................ 123/25 A

FOREIGN PATENT DOCUMENTS

| DE | 103 53 367 A1 | 6/2005 |
| DE | 10 2004 042 245 A1 | 3/2006 |
| GB | 2 129 329 A | 5/1984 |
| WO | WO 2005/088114 A1 | 9/2005 |

OTHER PUBLICATIONS

Machine Translation of WO 2005/088114.\*

\* cited by examiner

PROCESS AND APPARATUS FOR SEPARATING OUT AND REMOVING WATER PRESENT IN LIQUID FUELS, ESPECIALLY WATER FROM DIESEL OIL

FIELD OF THE INVENTION

The invention relates to a process for separating out and removing water present in liquid fuels, especially water from diesel oil. The fuel is conveyed in a line system to supply an internal combustion engine by a fuel delivery pump. Water is separated out at a filter arrangement having a collecting space for collecting the separated water and is connected upstream from the suction side of the fuel delivery pump so that its sucking action counteracts an outflow of water from the collecting space. Depending on the collection of a given amount of water at the filter arrangement, the sucking or suction action of the delivery pump is negated, and an outlet valve located at an outflow orifice of the collecting space for removing water is opened. Moreover, the invention relates to an apparatus for executing this process.

BACKGROUND OF THE INVENTION

The drainage of water, with these measures being carried out, is conventional and is especially essential when heavy diesel machinery is operated under severe use conditions. For example, when using heavy machinery with heavy diesel engines in less highly developed countries, obtaining fuel of Central European quality is difficult. In fact, in countries with difficult climatic conditions and poor infrastructure, users must expect that the available fuel will have significant impurities, in particular a high water content. Construction and agricultural machinery is often fueled from barrels stored and transported more often with little or no covering at all, so that they are exposed unprotected to the elements such as rain.

According to experience, a maximum water content in diesel oil of up to 10% can be expected. Vandalism and corrupt handling can be responsible for these high water contents.

When highly contaminated diesel oil is used, for example, in the tank of a high-performance common rail diesel engine with consumption of approximately 400 l/day, the amount of water to be drained is about 40 l/day. For commercial filters/water separators the capacity in the water collecting tank is at most 0.5 l. In view of this prior art, the operator, to carry out the conventional drainage process, must shut off the engine roughly 80 times during the workday to negate the suction force of the fuel delivery pump counteracting the outflow of water from the filter arrangement. The operator must also open the outflow orifice of the water collecting space to allow the collected water to flow out. If the operator does not observe the requirements, after some time water bleeds through the filter arrangement into the injection system damage it, resulting in very high maintenance costs and a correspondingly long downtime of the pertinent device.

SUMMARY OF THE INVENTION

An object of the invention is to provide a process meeting the requirements arising in operation of internal combustion engines, in particular heavy diesel engines, to an especially satisfactory degree.

Proceeding from conventional processes, this object is basically achieved according to the invention by negating the sucking action counteracting the outflow of water by a discharge. The discharge produces a pressure gradient enabling outflow of water at the outflow orifice of the collecting space over a discharge interval and during current operation of the fuel delivery pump.

The discharge process is initiated by a pressure difference produced between the inside of the collecting space and the outside causing discharge of water via the outflow orifice. The process according to the invention then enables discharge processes to be carried out while the engine is running. Therefore, discharge processes can be carried out in comparatively rapid succession and over comparatively short discharge intervals, without disrupting operation and during operation of the injection system, with the fuel delivery pump continuing to run. The storage volume of the injection system can be discharged without needing to shut down the engine.

The process according to the invention enables the option of complete automation. In an especially advantageous manner, a water sensor unit detecting collection of a given amount of water and its outflow produces a signal to activate the discharge means and to automatically initiate a discharge process. The danger that the water can bleed through due to operator error is therefore prevented.

In especially advantageous embodiments, the discharge has control electronics processing the signal of the water sensor unit to determine the discharge intervals and to produce control signals for activation of the discharge and control of the outlet valve during the determined discharge intervals.

The pressure gradient enabling outflow of water at the outflow orifice can be produced in different ways. For example, the discharge can have a discharge pump with a suction side connected to the outflow orifice of the collecting space and producing a pressure gradient when the discharge is activated. This embodiment constitutes a comparatively simple procedure in which sucking of water out of the collecting space takes place as necessary while the system remains in operation, without the need for interventions or changes on the actual line system.

Alternatively, the discharge has a hydropneumatic accumulator with an oil side charged with fuel by the fuel delivery pump, and a valve actuatable by the control electronics. By the accumulator in the filter arrangement over a discharge interval, a pressure is built up producing the pressure gradient necessary for outflow of water at the outflow orifice. In this form of the process, the advantage is that an additional discharge pump is not necessary.

Advantageously, depending on the signal of a temperature sensor detecting the temperature of the separated water, the control electronics can produce a heating control signal for a heating element. The heating element is designed to protect against freezing. In this way operating reliability is ensured even in winter operation or in cold climate zones.

The subject matter of the invention is also an apparatus for carrying out the process according to the invention.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
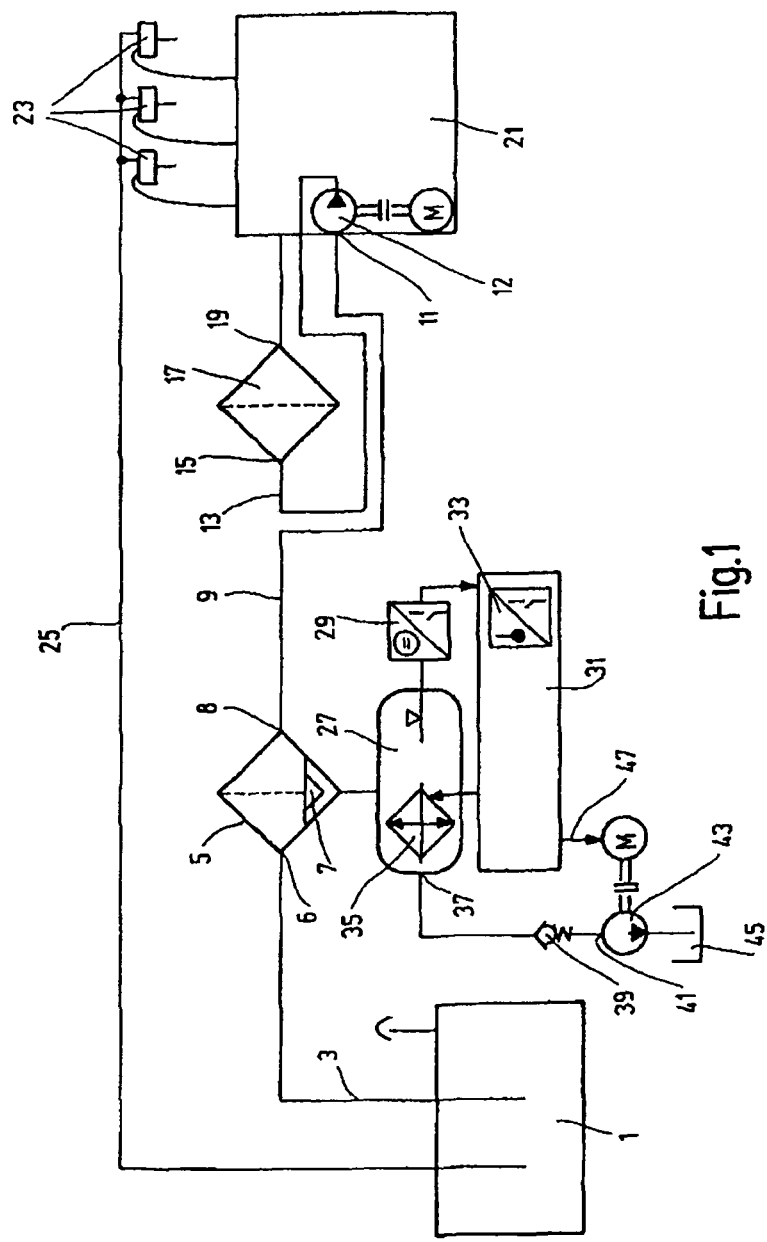
FIG. 1 shows a simplified operating or schematic diagram of a system according to a first exemplary embodiment of the invention.

To illustrate a first exemplary embodiment of the invention, FIG. 1 shows a schematic block diagram of the fuel supply system of a diesel engine with common rail injection. Emerging from a fuel tank 1 the line system has a tank line 3 leading to the inlet 6 of a prefilter 5. The prefilter 5 with a fineness of approximately 30μ has a water separator 7. The outlet 8 of the prefilter 5 is connected to a suction line 9 leading to the suction side 11 of a fuel delivery pump 12. Its pressure line 13 is connected to the inlet 15 of a fine filter 17 having a fineness of approximately 2-5μ. The outlet 19 of the fine filter 17 is connected to a common rail injection system 21 with its injection nozzles 23. Nozzles 23 are connected by a recirculation line 25 leading back to the tank 1.

Water separated from the fuel flowing through the prefilter 5 by the water separator 7 collects in the bottom region of the prefilter 5 and in the collecting space 27 adjoining the underside of prefilter 5. Details of the fluid connection and the positional relationship between the water separator 7 and the collecting space 27 are explained below using FIGS. 3 and 4. A water sensor unit 29 detects the height of the level of the collected water in the collecting space 27 and is connected by and transmits signals to the control electronics 31. The control electronics 31 processes not only the signals of the water sensor unit 29, but also those of a temperature sensor 33 to activate a heating element 35 in the collecting space 27 when a freezing temperature has been ascertained.

The collecting space 27 is connected via its outflow orifice 37 to the suction side 41 of the discharge pump 43. The discharge pump pressure side leads to a capture tank 45 for the discharged water. The pump 43 can be a pump version which blocks against backflow. Alternatively, a nonreturn valve 39 can be the outlet valve between the outflow orifice 37 and the pump 43.

When the water sensor unit 29 detects a level in the collecting tank 27 corresponding to a given amount of collected water and signals this condition to the control electronics 31, a discharge process is initiated by the control electronics 31 starting the motor of the pump 43 via the supply line 47. The intake capacity of the pump 43 is chosen such that its sucking or suction action exceeds the sucking or suction action of the fuel delivery pump 12 so that at the outflow orifice 37 of the collecting space a pressure gradient is produced such that the collected water flows out, i.e., is sucked out by the pump 43. The duration of the discharge interval with the pump 43 remaining on can be determined depending on the signal of the sensor unit 29. Operation of the pump 43 is adjusted by a certain amount when the water level drops, or can be controlled depending on time, by the pump 43 operating over a fixed time interval for each discharge process. In each instance the fuel delivery pump 12 remains in operation during the discharge processes so that the engine need not be shut down.

Figure 2:
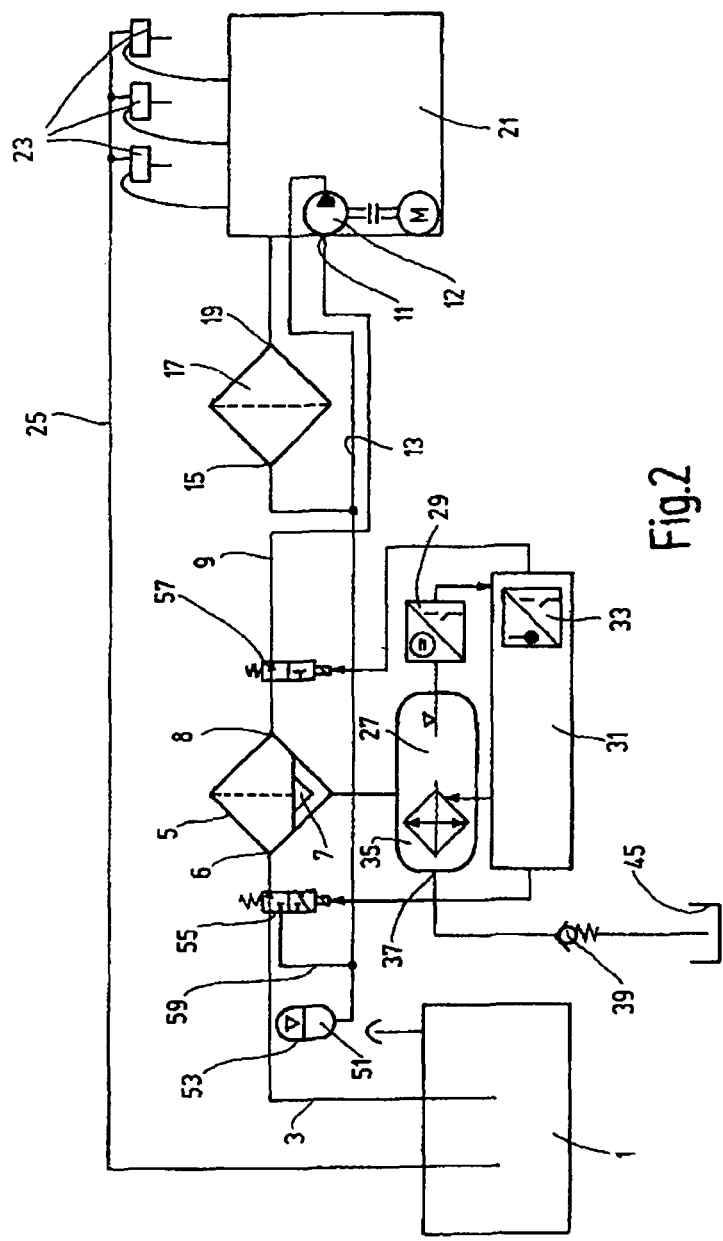
FIG. 2 is a simplified operation or schematic diagram of a system according to a second exemplary embodiment of the invention.

The example shown in FIG. 2 differs from the example shown in FIG. 1 by the use of a discharge in the form of a pressure control which replaces the discharge pump 43 from FIG. 1. Components which correspond to the example from FIG. 1 are designated in FIG. 2 with the same reference numbers as in FIG. 1. As is apparent from FIG. 2, the pressure line 13 of the fuel delivery pump 12 leads not only to the inlet 15 of the fine filter 17, but also to the oil side 51 of a diaphragm accumulator 53 charged with fuel by the operating fuel delivery pump 12. To initiate a discharge process taking place as in the first embodiment by delivering the signal from the sensor unit 29 and by the resulting activity of the control electronics 31, a 3/2-way valve 55 connected upstream from the inlet 6 of the prefilter 5 in the tank line 3 and a 2/2-way valve 57 connected downstream from the outlet 8 of the prefilter 5 are actuated. During the discharge interval, the valve 57 is closed and the valve 55 is actuated such that the tank line 3 is blocked and the oil space 51 of the diaphragm accumulator 53 is connected to the inlet 6 of the prefilter 5 by a branch line 59 and the 3/2-way valve 55. At the outflow orifice 37 of the collecting space 27 the pressure gradient presses the collected water out of the collecting space 27 to travel to the capture tank 45. The pressure gradient is formed by the pressurized volume of oil supplied to the prefilter 5 by the diaphragm accumulator 53. In the example shown in FIG. 2, the outlet 8 of the prefilter 5 during the discharge interval can be blocked by the valve 57. When the diaphragm accumulator 53 is charged with enough pressure and a sufficiently large volume of pressurized oil flowing via the valve 55 into the prefilter 5 is available in the oil space 51 so that a sufficient pressure rise is formed in the prefilter 5 during the discharge interval, the 2/2-way valve can be omitted. As in the first described embodiment, during the discharge interval the fuel delivery pump 12 can continue to operate, i.e., the engine need not be shut down. When the discharge interval is ended, the valve 55, optionally the valve 57, is controlled again such that flow takes place through the tank line 3 and the suction line 9. The branch line 59 is blocked again, and the diaphragm accumulator 53 is again charged by the pressure line 13.

Figure 3:
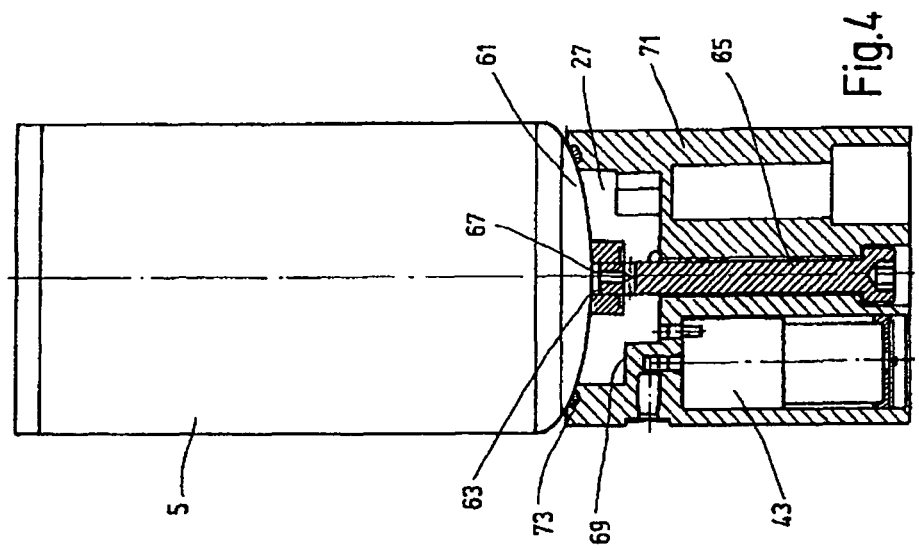
FIG. 3 is a schematic side elevational view partially in section of an apparatus according to the system of FIG. 1.
Figure 4:
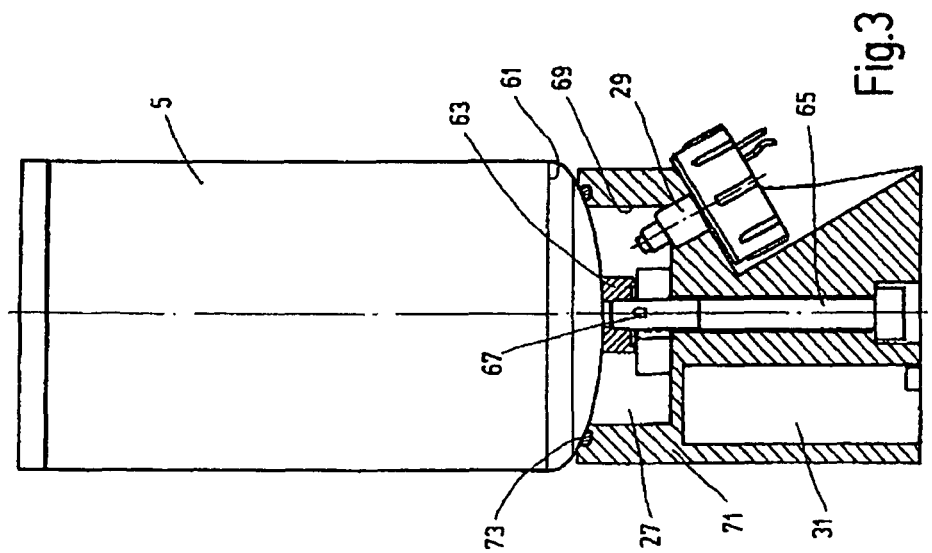
FIG. 4 is a schematic front elevational view partially in section of the apparatus of FIG. 3, turned 90° relative to FIG. 3.

FIGS. 3 and 4 show one example of the apparatus according to the invention for executing the process. The apparatus is made as a retrofit system attachable to the underside 61 of the prefilter 5 at a later time. Its filter casing is made in the form of a spin-on filter.

As FIGS. 3 and 4 show, the central region of the bottom on the underside 61 has a water outlet 63 with an internal thread. A hollow screw 65 is screwed into that internal thread. Internal holes 67 of screw 65 form a fluid connection between the bottom region on the underside 61 of the filter casing and a central depression 69 located on the upper end of a body 71. Body 71 is tightened by the hollow screw 65 on the underside 61 of the filter casing. A gasket 73 forms an edge-side seal.

The depression 69 forms the water collecting space 27 for the water separated out by the water separator 7 of the prefilter 5. The water level in the collecting space 27 is detected by the water sensor unit 29. Underneath the depression 69 forming the collecting space 27, cavities are in the body 71 for holding the control electronics 31 (see FIG. 3), the discharge pump 43 (see FIG. 4) and other components which are not shown.

While FIGS. 3 and 4 show the apparatus according to the invention in an exemplary embodiment made as a retrofit system suited for installation into existing systems at a later time. The invention is also especially suitable as original equipment for the pertinent systems.

In particular, the apparatus according to the invention together with the prefilter 5 having a separator 7 and other system components, such as the pump 43, sensor unit 29, electronics 31, heating element and the like, can be combined in a standard housing.

While various embodiments have been chosen to illustrate the invention, it will be understood by those skilled in the art that various changes and modifications can be made therein without departing from the scope of the invention as defined in the appended claims.

What is claimed is:

1. A process for separating and removing water in liquid fuels, comprising the steps of:
   conveying fuel in a line system to supply an internal combustion engine by a fuel delivery pump;
   passing the fuel through a filter upstream from a suction side of the fuel delivery pump;
   separating water from the fuel and collecting separated water in a collecting space in the filter;
   operating the fuel delivery pump such that a suction action thereof counteracts an outflow of the separated water from the collecting space having an outflow orifice;
   upon collection of a given amount of the separated water in the collecting space, negating the suction action of the fuel delivery pump by a discharge producing a pressure gradient enabling outflow of the separated water through the outflow orifice during a discharge interval and during operation of the fuel delivery pump;
   passing the separated water through the outflow orifice of the collecting space and through an outlet valve when opened at the outflow orifice during the discharge interval;
   detecting an amount of the separated water in the collecting space and producing a water amount signal representative of a detected amount of the separated water with a water sensor;
   processing the water amount signal in control electronics to determine discharge intervals and producing control signals for activation of the discharge during predetermined intervals;
   charging an oil side of a hydropneumatic accumulator with fuel from the fuel delivery pump; and
   activating a valve by the control electronics such that the accumulator builds up pressure in the filter to produce the pressure gradient needed for outflow of the separated water through the outflow orifice.

2. A process according to claim 1 wherein
   a temperature sensor detects a temperature of the separated water in the collecting space and generates a temperature signal representative of that temperature; and
   the control electronics produces a heating control signal in response to the temperature signal to activate a heater to protect the separated water in the collecting space from freezing.

3. A process according to claim 1 wherein the fuel is diesel oil.

4. An apparatus for separating and removing water in liquid fuels, comprising:
   a filter having a water separator, a filter inlet, filter outlet and a collecting space with an outflow orifice for collecting separated water;
   a fuel tank in fluid communication with said filter inlet through a line system;
   a fuel delivery pump of a fuel supply system for an internal combustion engine having a suction side connected in fluid communication with said filter outlet and a pressure side;
   a discharge having a pressure control for producing a pressure gradient at said outflow orifice to enable outflow of the separated water against a suction action of said fuel delivery pump at said filter during discharge intervals, said pressure control having a valve and a hydropneumatic accumulator with an oil side connected in fluid communication with said pressure side of said fluid delivery pump, said valve being connected to said filter inlet and said hydropneumatic accumulator to control fluid communication of said hydropneumatic accumulator with said filter;
   a water amount sensor in said collecting space for detecting amounts of the separated water collected in said collecting space and producing water amount signals representative of the amounts detected; and
   control electronics connected to said discharge and to said water amount sensor for receiving and processing the water amount signals and producing control signals and transmitting the control signals to said discharge to control said valve to control fluid communication between said filter and said hydropneumatic accumulator.

5. An apparatus according to claim 4 wherein
   said hydropneumatic accumulator is a diaphragm accumulator.

6. An apparatus according to claim 4 wherein
   said valve is a 3/2-way valve coupled to said fuel tank, alternatively connecting said filter inlet in fluid communication with said hydropneumatic accumulator and with said fuel tank.

7. An apparatus according to claim 4 wherein
   a retrofit system attaches said discharge, said water sensor and said control electronics to an existing filter with a water separator.

8. An apparatus according to claim 7 wherein
   said filter is a spin-on filter element and has a filter casing with a water outlet on a bottom thereof; and
   said retrofit system includes a body attached to said bottom and includes a casing surrounding said water outlet of said filter casing and forming a component of said collecting space.

9. An apparatus according to claim 8 wherein
   said body is attached to said casing by a hollow screw threadedly connected to said water outlet and having holes forming a water passage to said cavity.

10. An apparatus according to claim 9 wherein
    said body receives said water amount sensor, said control electronics and said valve therein.

* * * * *